Oct. 8, 1963 J. B. MEISTER 3,106,340

READ-OUT AND RECORDING APPARATUS

Filed Aug. 5, 1958 2 Sheets-Sheet 1

INVENTOR.
JACK B. MEISTER
BY
George V. Hall
ATTORNEY.

Oct. 8, 1963 J. B. MEISTER 3,106,340

READ-OUT AND RECORDING APPARATUS

Filed Aug. 5, 1958 2 Sheets-Sheet 2

INVENTOR.
JACK B. MEISTER

BY

[signature]
ATTORNEY.

United States Patent Office 3,106,340
Patented Oct. 8, 1963

3,106,340

READ-OUT AND RECORDING APPARATUS

Jack B. Meister, Morristown, N.J., assignor to Monroe Calculating Machine Company, Orange, N.J., a corporation of Delaware Filed Aug. 5, 1958, Ser. No. 753,289
6 Claims. (Cl. 235—60.27)

This invention relates to digital recording apparatus and particularly to such apparatus including a ten-key adding machine operable to print digital values which are read out from a non-visible or coded recording means of a computing system or the like.

Read-out apparatus, wherein a conventional ten-key adding machine is controlled to print read-out digital values, has heretofore operated to enter the digits of each value into the ordinally shiftable selector carriage of the machine successively from higher to lower orders.

This has been necessary because such machines are designed for entry of the digits of a value upon successive depression of the numeral keys corresponding to the respective digits of the values from higher to lower orders. The digits when printed therefore will appear in proper decimal sequence. In many instances, however, particularly in electronic computing systems, it is more feasible to read out the decades of the calculated values successively from lower to higher orders.

The primary object of the invention therefore is to provide a ten-key adding machine adapted for entry of the digits of a value successively from lower to higher orders but which is operable to print the digits so that they will be read in proper decimal sequence from higher to lower orders.

Another object of the invention is to control the position of the selector carriage of the ten-key adding machine so that the digits of the successive values will be printed in correct ordinal alignment.

Other objects and advantages of the invention will be evident from the following description with refrence to the accompanying drawings in which.

Figure 1:
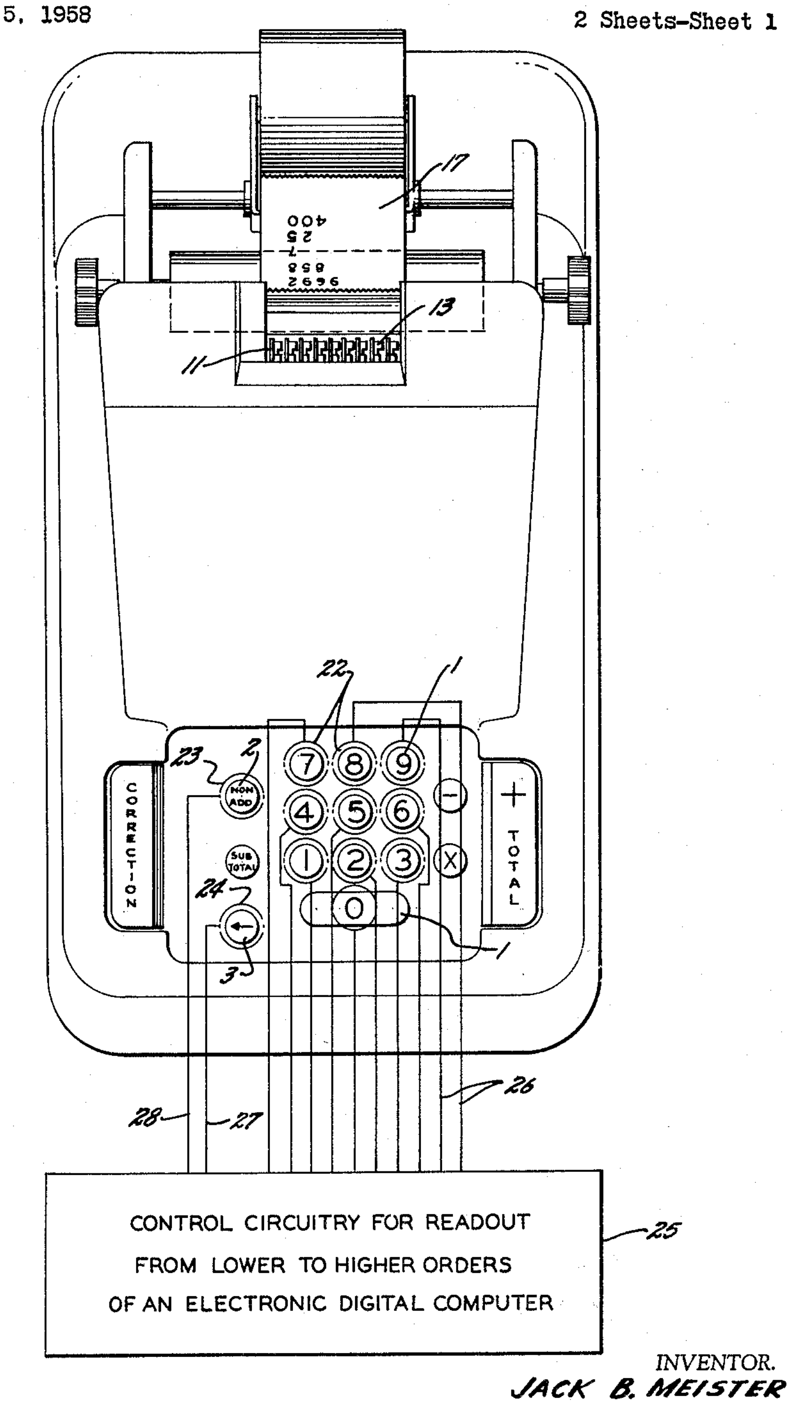
FIG. 1 is a plan view of a ten-key adding listing machine embodying the invention.

A preferred form of the invention is disclosed herein as embodied in a ten-key motor operated adding machine which operates generally according to the disclosures of Patent 1,899,444 to Thomas A. Mehan and improvement Patent 2,203,336 to Walter W. Landsiedal modified in operation by the devices of the invention.

The invention concerns control of the machine to print values entered into the selector carriage upon depression of the 0—9 digital value keys and not with registering of the values nor with subsequent total taking operations. A brief description therefore of the selection and printing mechanism is sufficient for a complete understanding of the invention. Reference is made to the aforenoted patents for a complet description of the machine functions.

The keyboard of the ten-key adding and listing machine (FIGS. 1, 2) includes the usual 0—9 digital value keys 1, a non-add key 2, and a shift key 3. The invention is not concerned with the operation of other function keys of the keyboard.

Mounted beneath the keyboard is a pin carriage 4 (FIG. 2) carrying an ordinal series of rows of settable stop pins 5. Upon selective successive depression of digit keys 1, the pin rows, from higher to lower orders, are set to values corresponding respectively to that of the depressed keys. To bring each pin row into setting position with respect to digit keys 1, carriage 4 is step shifted one ordinal position to the left upon depression of each digit key.

In the usual operation of the machine, the successive digits of a value are entered into pin carriage 4 upon successive depression of the digit keys 1 corresponding to the digits of the value from higher to lower orders, i.e., as the digits of a value are normally read. Consequently, the digits are entered into pin carriage 4 by setting the highest digit of a value in the leftmost row of pins 5 and step shifting said carriage toward the left to set the successive lower order pin rows.

As heretofore noted, the invention provides for entry of a value into pin carriage 4 upon successive depression of digit keys 1 corresponding to the successive digits of the value from lower to higher orders. Consequently, the lowest order digit of a value will be set in the leftmost pin row of carriage 4 and the successive higher orders of the value will be set in the successive order pin rows extending toward the right.

Reciprocatory actuator racks 7 are controlled in their excursions in accordance with the respective settings of the rows of pins 5 of carriage 4. Actuator racks 7 are connected with forwardly extending stop arms 8 which, upon rearward movement of the racks, are adapted to engage set pins 5 of associated key rows thereby arresting rearward movement of said racks.

When pin carriage 4 is in normal rightmost position, the leftmost row of pins 5 is located immediately to the right of the rightmost stop arm 8. Therefore, as pin carriage 4 is step shifted toward the left upon successive depression of digit keys 1, the pin rows from left to right will be brought successively into the path of movement of stop arms 8 successively from right to left.

Figures 2, 3, 4, 5:
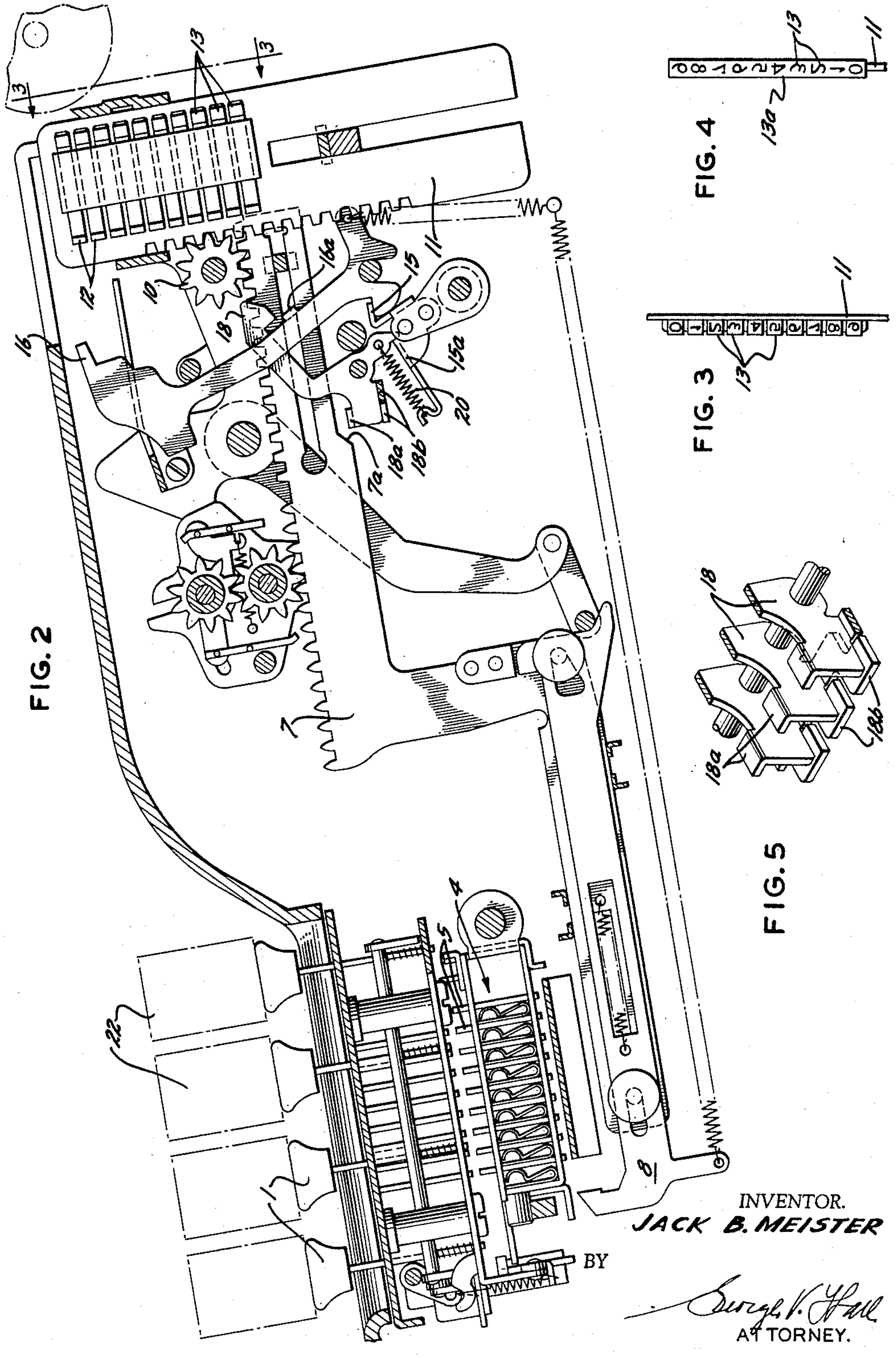
FIG. 2 is a longitudinal vertical section through the machine.
FIG. 3 is a view of the digit type as viewed from the direction of the arrows of line 3—3 of FIG. 2.
FIG. 4 is a modified form of the digit type.
FIG. 5 is a fragmentary perspective view of the type hammer latches which are operable to control the printing of zeros.

Each actuator rack 7 engages an intermediate pinion 10 (FIG. 2) which engages a type rack 11. Each type rack 11 has mounted thereon a vertical series of plungers 12 which are spring held toward the front of the machine. Mounted at the rear of plungers 12 respectively are 0—9 digit type 13 (FIGS. 2, 3).

The zero digit type 13 are normally at printing line position and therefore as racks 7 are moved toward the rear in the first half of a machine cycle, pinions 10 are operable to raise the associated type racks 11 thereby bringing the successive higher value digit type 13 to printing line position until stop arms 8 are arrested by engagement with set pins 5 of carriage 4.

During a mid-cycle dwell of the machine drive, a bail 15 is rocked counterclockwise to release hammers 16 which are spring impelled clockwise to engage flanges at the rear of the plungers 12 which have been raised to aligned position with respect thereto. The engaged plungers therefore will be driven toward the rear to strike the appropriate digit type 13 against a paper strip 17 to print the digits corresponding to the value entered into pin carriage 4. During the last half of the machine cycle, the parts will be restored with pin carriage 4 moved to its normal rightmost position. The above is the usual printing operation of a ten-key listing machine wherein the digital values are read on paper strip 17 as viewed from the front of the machine.

To permit entry of the digits of a value from lower to higher orders, the invention provides for mounting of digit type members 13 in upside-down position on plungers 12. It will be noted that when the digit type members are in upside-down position they are also laterally reversed. This upside-down mounting of the digit type is clearly illustrated in FIG. 3.

In certain listing machine structure, the digit type are integral on a continuous strip. In such instances, it would be expedient to reverse the entire strip 13a as shown in FIG. 4. In this arrangement, the type for the 9 digits would be normally at printing line position and the successive lower value digits would be brought to printing line position as actuator racks 7 are moved rearwardly. It would be necessary therefore to depress the zero key as shown in the drawings for the registration of 9, the 1 digit key for the registration of 8, etc. Obviously the digit designations on keys 1 would be changed accordingly.

With type members 13 in upside-down and laterally reversed position and the digits of a value entered into the machine from lower to higher orders, the digits will be printed on paper strip 17 as illustrated in FIG. 1. It will be noted that, as viewed from the front of the machine, the digits are not only printed upside down but are also laterally reversed. To correctly read the digits from higher to lower orders, the viewer would stand at the rear of the machine, to observe paper strip 17 which, as it is stepped for printing of the successive values, would be directed to the rear and downwardly by suitable guide means (not shown). This rear viewing will bring the digits from upside-down and laterally reversed position to the position in which they would normally be read. If it is desired to wait until completion of the printing of a series of values, paper strip 17 would be torn from the paper roll and reversed so as to be read in conventional manner.

From an inspection of FIG. 1, it will be noted that the digits of the several values printed on strip 17 are in ordinally aligned position. To print the digits of the values in ordinally aligned position, means is provided after entry of each value into pin carriage 4 to shift said pin carriage to its leftmost position in response to the single depression of shift key 3 before a printing operation which will be effected in response to depression of non-add key 2.

It is well known in ten-key listing machines to provide means to shift the pin carriage a plurality of orders to the left in response to the single depression of a key. Patent 2,058,922 issued to B. C. Stickney, Patent 2,061,-362 issued to L. E. Lentz, Patent 2,062,963 issued to E. Benninger, and Patent 2,970,755 issued to H. Gang all disclose means for controlling the shift mechanism of a pin carriage to permit said carriage to be shifted a given distance toward the left in response to the single depression of a key.

Referring particularly to the Gang patent, there is disclosed an escapement mechanism for a pin carriage which is spring urged toward the left. As described in column 6 of the patent specification, the single depression of a shift key releases the pin carriage from the escapement mechanism and the carriage is then shifted directly to the left end position.

As previously noted, the present invention is disclosed as embodied in a machine which operates generally according to the disclosures of Patents 1,899,444 and 2,203,-336. The pin carriage of the machine of these patents, as in Gang, is spring urged to the left and restrained by an escapement. The escapement of Gang and its control could therefore be readily incorporated in applicant's machine.

It is necessary to modify the printing mechanism of the machine in the control of the zero printing. Normally, zeros are printed to the right of the rightmost significant digit as viewed from the front of the machine and means is provided for non-print of zeros to the left of the leftmost significant digit. In practicing the present invention, this control of zero printing must be reversed, i.e., zeros must be printed to the left of the leftmost significant digit as viewed from the front of the machine and suppressed to the right of the rightmost significant digit. From an inspection of FIG. 1 this reversal of zero printing control is illustrated by the value 400 on paper strip 17 wherein two zeros are printed at the left of the digit 4, as viewed from the front of the machine, and zero printing is suppressed to the right of the digit.

To effect the above control of zero printing, a normally disabled latch 18 (FIGS. 2, 5) is adapted for engagement with a lug 16a on the arm of each print hammer 16 to restrain said hammer from clockwise printing operation. Normally, latches 18 are held counterclockwise in disabled position against the urge of springs 20 by a front extension 15a of bail 15 as shown in FIG. 2. Just prior to the release of hammers 16 by bail 15, bail extension 15a will release latches 18. However, if a rack 7 has moved rearwardly from zero registering position, an edge 7a of the rack will engage a lug 18a at the front of the associated latch 18 thereby preventing clockwise movement thereof to engage the lug 16a of the associated hammer 16. Therefore, hammer 16 will fire to effect a printing operation.

Each latch 18 has a lug 18b which extends toward the right as viewed from the front of the machine and underlies the next adjacent latch at its right. Therefore, if a latch 18 is restrained from clockwise movement by the associated rack 7, all latches to the left will likewise be restrained from clockwise movement to latch and prevent operation of hammers 16. Consequently, a printing operation will be effected in all orders to the left of a significant digit and therefore zeros will be printed to the left of the leftmost significant digit. However, in the orders to the right of the order in which the rightmost significant digit is registered, latches 18 will be rocked clockwise when released by bail extension 15a and will engage lugs 16a of hammers 16 to prevent those hammers from operation to print zeros.

Solenoids 22, indicated by dot-dash lines, are adapted to depress 0—9 digit keys 1, and solenoids 23 and 24, also indicated by dot-dash lines (FIG. 1), are adapted to depress non-add key 2 and shift key 3 repectively. These solenoids may be supported above the keyboard in any suitable manner (not shown) with the bottoms of their plungers adjacent the tops of digit keys 1 and function keys 2 and 3. Control circuitry, generally indicated at 25 for read-out from lower to higher orders of an electronic digital computer, is adapted to control operation of solenoids 22, 23 and 24.

In a read-out operation, means is operable first to scan the successive counter decades of the computer from lower to higher orders. This operation will cause successive energization of solenoids 22 through lines 26 to depress the digit keys 1 corresponding respectively to the values registered in the successive counter decades of the computer. Subsequent to the scanning operation of the counter decades of the computer, the scanning means will be operable to energize solenoid 24 through a line 27. This will cause pin carriage 4 to be shifted to its left end position. Thus when the digital values are printed, they will be ordinally aligned as previously described. Subsequent to this shifting operation, the scanning means will be effective to energize solenoid 23 through line 28 and this will effect a non-add cycle of operation of the listing machine to print the values entered in pin carriage 4.

Reference is made to Patent 2,793,806 issued to J. L. Lindesmith for control circuitry which is operable to read out from the counter decades of an electronic binary computer. This operation is described generally starting at column 3, line 30 of said patent. The control circuitry of this patent however is disclosed as adapted to read out into a full keyboard machine. The operation is briefly as follows.

Scanning means is operable to first scan the units decade of the electronic computer and cause energization of one of a bank of nine solenoids which is adapted to depress the appropriate 1—9 digital value key in the units order row of the full keyboard adding machine.

The scanning means is next operable to scan the tens order of the electronic computer and cause operation of one of a second bank of nine solenoids to depress the appropriate 1—9 digital value key in the tens order row of the full keyboard adding machine. It will be obvious that the circuitry disclosed in this patent, which is operable to scan the successive decades of the computer and thereby control operation of solenoids in successive order key rows of a full keyboard adding machine, may be connected in parallel to operate the single set of solenoids 22 which are operable to depress digit keys 1 of the ten-key machine of the present disclosure. It will be noted that an additional line 26 for solenoids 22 for zero digit key 1 must be supplied for the reason that there are no zero keys on the full keyboard machine. This could readily be supplied by one skilled in the art in consideration of the patent disclosure. The following with reference of FIG. 1 of Patent 2,793,806 will illustrate the simplicity of the modification to adapt the read-out circuitry to operate a ten-key machine.

In FIG. 1 of the patent, an order selector circuit 33*a* has a units order group of leads and a tens order group connected respectively to a units order and a tens order bank of solenoids for the full keyboard. Obviously the two groups of leads could be connected in parallel to control a single bank of keys which single bank would correspond to the ten-key keyboard of applicant's FIG. 1.

The patent column 3, line 69 through column 4, line 11 describes the sequential value entering operations with which we are concerned, and the parallel connections would provide for selective successive energization of the single bank of solenoids to enter the digits from lower to higher orders into the ten-key machine. The patent describes the read-out for only two counter decades; however, read-out of any required number of counter decades may be provided as noted in the patent column 24, line 74 through column 25, line 5.

Subsequent to scanning of the successive decades of the computer, the scanning means of the patent disclosure is operable to energize a first machine control solenoid and then a second control machine solenoid. It will be seen therefore that this operation of the scanning means is readily adaptable to sequentially energize solenoids 24 and 23 of the present disclosure to effect the carriage shifting and printing operations respectively. Reference is made to the patent column 4, line 2–10 for a description of these operations wherein, after entry of the digits into the machine, solenoids 23 and 29 are pulsed in sequence. The circuit for control of solenoid 23 of the patent would control solenoid 24 of the application, and the circuitry for control of solenoid 39 of the patent would control solenoid 23 of the application.

It will be observed from the above with reference to the patent that the only alteration necessary in the circuitry of the patent for operation with applicant's ten-key machine is the provision of the parallel connections for the single bank of keys. The required sequence of operations, i.e., sequential energization of the digit entering solenoids, and then sequential energization of two machine control solenoids is provided for by scanning circuit 33 of the patent as noted in column 4, lines 2–10.

Although the invention has been described in connection with a read-out from lower to higher counter decades of an electronic computer, it will be understood that this is only illustrative of a utility of the invention where it is desirable that read-out means be operable from lower to higher orders of any recording or computing system. For example, it may be desirable to read the successive digits recorded on a punched tape from lower to higher orders. Such a disclosure for reading from a punched tape to a typewriter is disclosed in Patent 2,378,371 issued to H. L. Tholstrup. This disclosure of a read-out to a typewriter is necessarily from higher to lower orders. However, it will be readily understood that the punched tape could be read out in reverse direction if it is desired to operate the adding machine of the present disclosure. Furthermore, it will be understood that the ten-key machine need not necessarily be of the type having pin carriage selection means but could be of any ten-key type wherein ordinally arranged selection means is set sequentially in response to selective successive depression of the digital value keys. Also it will be apparent that the selection means need not necessarily be set nor the machine functions be initiated by direct action of the solenoids on respective digital value and machine function keys, but the solenoids could, in certain instances, operate directly on the parts independently of direct key depression. Moreover it will be obvious that the registering mechanism, total taking, etc. could be entirely eliminated from the machine as its only function is the listing of read-out values. The invention therefore is to be restricted only as necessitated by the spirit and scope of the appended claims.

I claim:

1. In a recording system: a listing machine including an ordinal series of differentially settable digital type members each having thereon 0—9 digit type mounted to print the corresponding digits respectively upside-down and laterally reversed on a record sheet as normally viewed from the front of the machine, and an ordinal series of differentially settable digital value selection means ordinally shiftable with respect to said type members for controlling the settings thereof; means operable to set said selection means successively from left to right in accordance with the digits of a plural digit value from lower to higher orders and to shift said selection means one ordinal position toward the left with each setting operation to bring said selection means from left to right successively into controlling position with respect to said type members from right to left, and means for initiating operation of said digital type members.

2. In a recording system; a listing machine including an ordinal series of differentially settable digital type members each having thereon 0—9 digit type mounted to print the corresponding digits respectively upside-down and laterally reversed on a record sheet as normally viewed from the front of the machine, and an ordinal series of differentially settable digital value selection means ordinally shiftable with respect to said type members for controlling the settings thereof; means operable to set said selection means successively from left to right in accordance with the digits of a plural digit value from lower to higher orders and to shift said selection means one ordinal position toward the left with each setting operation to bring said selection means from left to right successively into controlling position with respect to said type members from right to left; means operable to shift said selection means leftwardly to a given control position with respect to said type members, and means for initiating operation of said digital type members.

3. In a recording system; a listing machine including an ordinal series of differentially settable digital type members each having thereon 0—9 digit type mounted to print the corresponding digits respectively upside-down and laterally reversed on a record sheet as normally viewed from the front of the machine, an ordinal series of differentially settable digital value selection means ordinally shiftable with respect to said type members for controlling the settings thereof, operating means for each type member means operable when each type member is in 0 position to disable its operating means, and means operable upon movement of each type member from 0 position to render ineffective the associated disabling means and all disabling means to the left thereof; means operable to set said selection means successively from left to right in accordance with the digits of a plural digit value from lower to higher orders and to shift said selection means one ordinal position toward the left with each setting operation to bring said selection means from left to right successively into controlling position with respect to said type members from right to left; means operable to shift said selection means left wardly to a given control position with respect to said type members, and means for initiating operation of said digit type members.

4. In a recording system; a listing machine including an ordinal series of differentially settable digital type members each having thereon 0—9 digit type mounted to print the corresponding digits respectively upside-down and laterally reversed on a record sheet as normally viewed from the front of the machine, a selector carriage ordinally shiftable with respect to said type members and having thereon an ordinal series of differentially settable digital value selection means for controlling the settings of said digital type members, 0—9 digital value keys adapted for selective successive depression, means responsive to successive depression of said keys to set said selection means successively from left to right respectively in accordance with the values of said depressed keys, and means operable in response to each key depression to step shift said carriage toward the left to bring said selection means from left to right successively into controlling position with respect to said type members from right to left; means for depressing said keys successively in accordance with the digits of a plural digit value from lower to higher orders, and means for initiating operation of said digital type members.

5. In a recording system; a listing machine including an ordinal series of differentially settable digital type members each having thereon 0—9 digit type mounted to print the corresponding digits respectively upside-down and laterally reversed on a record sheet as normally viewed from the front of the machine, a selector carriage ordinally shiftable with respect to said type members and having thereon an ordinal series of differentially settable digital value selection means for controlling the settings of said digital type members, 0—9 digital value keys adapted for selective successive depression, means responsive to successive depression of said keys to set said selection means successively from left to right respectively in accordance with the values of said depressed keys, means operable in response to each key depression to step shift said carriage toward the left to bring said selection means from left to right successively into controlling position with respect to said type members from right to left, and a print key operable upon depression to initiate operation of said digital type members; a solenoid operable to depress each of said digit keys and said print key, and means for energizing said digit solenoids successively to depress said digit keys respectively in accordance with a plural digit value from lower to higher orders and subsequently to energize said print solenoid.

6. In a recording system; a listing machine including an ordinal series of differentially settable digital type members each having thereon 0—9 digit type mounted to print the corresponding digits respectively upside-down and laterally reversed on a record sheet as normally viewed from the front of the machine, a print key operable upon depression to initiate operation of said digital type members, a selector carriage ordinally shiftable with respect to said type members and having thereon an ordinal series of differentially settable digital value selection means for controlling the settings of said digital type members, carriage shifting means, a shift key operable upon depression to cause said shift means to shift said carriage leftwardly to a given position, 0—9 digital value keys adapted for selective successive depression, means responsive to successive depression of said keys to set said selection means successively from left to right respectively in accordance with the values of said depressed keys, and means operable in response to each digit key depression to cause said shift means to step shift said carriage toward the left to bring said selection means from left to right successively into controlling position with respect to said type members from right to left; a solenoid operable to depress each of said digit keys, said shift key and said print key, and means for energizing said digit solenoids successively to depress said digit keys respectively in accordance with a plural digit value from lower to higher orders and subsequently to energize said shift and print solenoids seriatim.

References Cited in the file of this patent

UNITED STATES PATENTS

| | | |
|---|---|---|
| 1,293,094 | Herbst | Feb. 4, 1919 |
| 2,058,922 | Stickney | Oct. 27, 1936 |
| 2,200,932 | Neidich | May 14, 1940 |
| 2,203,336 | Landsiedel | June 4, 1940 |
| 2,486,959 | Mehan | Nov. 1, 1949 |
| 2,497,784 | Mehan et al. | Feb. 14, 1950 |
| 2,647,690 | Anderson | Aug. 4, 1953 |
| 2,724,550 | Drake et al. | Nov. 22, 1955 |
| 2,970,754 | Gang | Feb. 7, 1961 |